United States Patent [19]
Saito et al.

[11] Patent Number: 6,154,177
[45] Date of Patent: *Nov. 28, 2000

[54] ANTENNA DEVICE AND RADIO RECEIVER USING THE SAME

[75] Inventors: Yutaka Saito, Ishikawa; Nozomi Kou; Hideo Nakanishi, both of Kanagawa, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/146,895

[22] Filed: Sep. 3, 1998

[30] Foreign Application Priority Data

Sep. 8, 1997 [JP] Japan .................................... 9-257998

[51] Int. Cl.$^7$ ....................................................... H01Q 1/24
[52] U.S. Cl. ......................... 343/702; 343/728; 343/742; 343/867; 343/876; 343/895
[58] Field of Search ..................................... 343/702, 725, 343/726, 728, 741, 742, 866, 867, 895, 876; H01Q 1/24, 21/00, 1/36

[56] References Cited

U.S. PATENT DOCUMENTS

| | | | |
|---|---|---|---|
| 4,358,769 | 11/1982 | Tada et al. | 343/742 |
| 5,201,072 | 4/1993 | Kobayashi | 343/713 |
| 5,335,010 | 8/1994 | Lindemeier et al. | 343/876 |
| 5,649,306 | 7/1997 | Vannata et al. | 343/702 |
| 5,905,467 | 5/1999 | Narayanasswamy et al. | 343/702 |
| 5,914,691 | 6/1999 | Mandai et al. | 343/702 |
| 5,918,189 | 6/1999 | Kivela | 343/702 |
| 5,940,040 | 8/1999 | Koyanagi et al. | 343/702 |

*Primary Examiner*—Don Wong
*Assistant Examiner*—Hoang Nguyen
*Attorney, Agent, or Firm*—Pearne & Gordon LLP

[57] ABSTRACT

In antenna device which is to be used in a portable radio receiver, plural loop antennas 1 and 3 which are formed along different faces of a case 9 of the radio receiver, respectively, and switching means 5 for selecting one of received signals from the plural loop antennas are disposed. Reception is performed while selecting a loop antenna having a higher received signal level. When an antenna having the directivity or the plane of polarization which are more advantageous is selected, it is possible to ensure high reception performance.

17 Claims, 3 Drawing Sheets ated in, for example, Japanese patent publication (Kokai) 6-140963.

ANTENNA DEVICE AND RADIO RECEIVER USING THE SAME

BACKGROUND OF THE INVENTION

The present invention relates to an antenna device which is useful mainly in a small portable receiver such as a pager, and a radio receiver using such an antenna device, and particularly to a configuration in which stable reception performance can be ensured in various use modes.

In a small portable receiver such as a pager which is to be attached to a human body, a loop antenna which exhibits excellent antenna characteristics in the vicinity of the human body is mounted in a case. Usually, such a loop antenna has a metal loop element which has a rod-like or plate-like shape and which is mounted on a circuit board, and is connected a low-noise amplifier of a receiving circuit via a matching circuit.

A loop antenna reacts to the magnetic field component of an electromagnetic wave rather than the electric field component. On the other hand, a human body can be approximately deemed as a conductor. In the vicinity of a human body, the electric field is weakened because of an electric image, but the magnetic field is conversely strengthened. Therefore, the antenna characteristics of a loop antenna in the case where the antenna is used in the vicinity of a human body are superior to those in the case where the antenna is used in another place.

Recently, it is requested to ensure high reception performance also when a receiver is located in a place separated from a human body, for example, in a handbag or on a table. To comply with this, a technique in which an external antenna is mounted on an external battery case is proposed in, for example, Japanese patent publication (Kokai) 6-140963.

In a conventional small portable receiver having a built-in internal loop antenna, the reception performance depends on the antenna characteristics of the single loop antenna. Consequently, such a receiver has a problem in that the reception performance for a wave reaching from a direction where the antenna directional gain is low, or a wave having a plane of polarization which is different from that of the loop antenna cannot be enhanced.

Moreover, such a loop antenna device has a problem in that, when a small portable receiver is not attached to a human body, the free space gain of the antenna itself cannot be increased.

In a conventional small portable receiver to which an external antenna is connected in order to improve the reception performance in the case where the receiver is separated from a human body, there is a problem in that a large number of terminals must be provided for connection and hence the configuration is complicated.

Furthermore, a conventional small portable receiver having internal and external antennas has a problem in that a loss due to a switching circuit for switching over the internal and external antennas lowers the reception performance.

SUMMARY OF THE INVENTION

The invention has been conducted in order to solve the problems of the prior art. It is an object of the invention to provide an antenna device in which high reception performance can be ensured in any situation, and also to provide a portable radio receiver to which such an antenna device is attached, and a method of exactly determining an antenna which is to be used in reception.

In the antenna device of the invention, plural loop antennas are disposed along a case of a portable radio receiver so that the antennas have different directivities and planes of polarization.

According to this configuration, it is possible to ensure high reception performance for incoming waves from various directions or those of various polarizations.

The antenna device of the invention is configured so that a loop antenna and a helical antenna are disposed in a portable radio receiver so as to perform diversity reception.

According to this configuration, even when the radio receiver is not attached to a human body, it is possible to ensure high reception performance.

In the antenna device of the invention, a helical antenna is incorporated into a switch unit which is drawn out to the outside from a case of a portable radio receiver, and a switch signal of the switch unit is superimposed in a transmission line which transmits a received signal from the helical antenna.

According to this configuration, an external antenna can be connected to the radio receiver without increasing the number of terminals for connection.

In the antenna device of the invention, received signals from plural antennas are amplified by low-noise amplifiers, and switching for diversity reception is then performed.

According to this configuration, an effect due to a transmission loss which is produced in switching means can be eliminated and high reception performance can be ensured.

Specifically, according to the present invention, it is provided an antenna device to be used in a portable radio receiver, comprising: plural loop antennas disposed along different faces of a case of the radio receiver, respectively; and switching means for selecting one of received signals from the plural loop antennas, the selected one loop antenna having a higher receiving signal level. Since reception of directional diversity or polarization diversity is performed, it is possible to ensure high reception performance.

Further, according to the present invention, two loop antennas are disposed along two faces of the case, the faces perpendicularly intersecting with each other. Since reception of directional diversity or polarization diversity is performed on incoming waves from various directions or those of various polarizations, it is possible to ensure high reception performance.

Further, according to the present invention, it is provided an antenna device to be used in a portable radio receiver, comprising: a loop antenna disposed along at least one face of a case of the radio receiver; a helical antenna disposed along another face of the case; and switching means for selecting one of received signals from the loop antenna and the helical antenna, the selected one antenna having a higher receiving signal level. Even when the radio receiver is not attached to a human body, it is possible to ensure high reception performance.

Further, it is provided an antenna device to be used in a portable radio receiver, comprising: a loop antenna disposed along at least one face of a case of the radio receiver; a switch unit which is drawn out to an outside from the case; a helical antenna which is incorporated into the switch unit; a transmission line which transmits a switch signal of the switch unit and a received signal from the helical antenna, in a superimposed manner; and switching means for selecting one of received signals from the loop antenna and the helical antenna, the selected one antenna having a higher receiving signal level. Connection of an external antenna can be realized by a simple configuration without increasing the number of terminals for connection. Moreover, connection of an external antenna ensures high reception performance.

Further, the antenna device further comprises low-noise amplifiers which amplify received signals from the antennas, respectively, and the switching means selects one of received signals which are amplified by the low-noise amplifiers. An effect due to a transmission loss which is produced in the switching means can be eliminated and high reception performance can be ensured.

Further, the antenna device further comprises plural high-frequency transistors to which the received signals from the antennas are supplied, respectively, collector outputs of the high-frequency transistors are connected together, and selection of the received signals is performed by controlling base biases of the high-frequency transistors. The low-noise amplifiers and an antenna switching circuit can be configured by a simple circuit, and high reception performance can be ensured.

Further, according to the present invention, an antenna device as described-above is disposed in a portable radio receiver. In the radio receiver, high reception performance can be ensured.

Furthermore, according to the present invention, it is provided a method of determining a working antenna in which one working antenna to be used in reception is selected from plural antennas disposed in a portable radio receiver, the method comprising the steps of: amplifying received signals from the antennas by low-noise amplifiers, respectively; sequentially selecting the amplified received signals; detecting received signal levels of the received signals; and selecting an antenna of a highest received signal level as the working antenna. The working antenna can be selected under a satisfactory reception sensitivity, and hence the selection can be exactly performed.

Further, collector outputs of plural high-frequency transistors to which the received signals from the antennas are supplied, respectively are connected together, and selection on the received signals is performed by turning ON or OFF application of a base bias to the high-frequency transistors. The selection of the working antenna can be implemented by using a simple circuit configuration.

Further, according to the present invention, the method of determining a working antenna according is executed in a portable radio receiver. Reception of directional diversity or polarization diversity can be exactly performed in the portable radio receiver.

Moreover, according to the present invention, it is provided a method of determining a working antenna in which one working antenna to be used in reception is selected from plural antennas disposed in a portable radio receiver, the method comprising the steps of: comparing received signal levels of the antennas with a threshold; and selecting an antenna of a lowest received signal level as the working antenna when all of or any one of the received signal levels exceeds the threshold. According to this configuration, the antijam properties in an area of a strong electric field can be improved.

Still further, according to the present invention, a method of determining a working antenna is executed in a portable radio receiver. The antijam properties of the radio receiver can be improved.

DETAILED DESCRIPTION OF THE PREFERRED EMBODIMENTS

Hereinafter, embodiments of the invention will be described with reference to FIGS. 1 to 5.

First Embodiment

Figure 1:
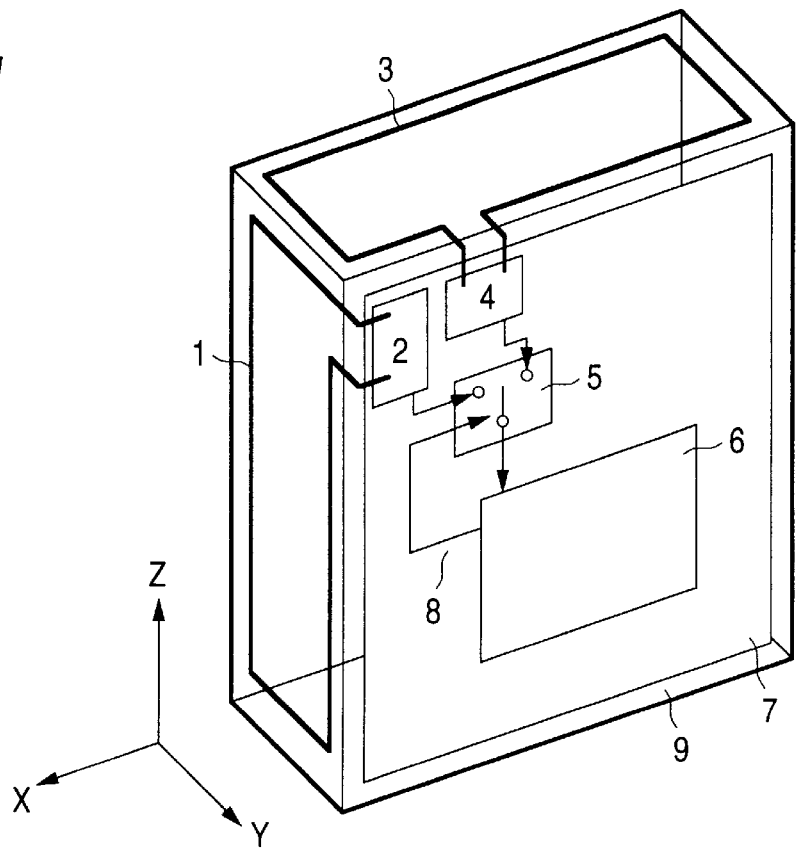
FIG. 1 is a diagram showing the configuration of a small portable receiver to which an antenna device of a first embodiment of the invention is attached.

As shown in FIG. 1, a small portable receiver on which an antenna device of a first embodiment is mounted comprises: a first loop antenna 1 which is formed on one face of a receiver case 9; a second loop antenna 3 which is formed on another face of the receiver case 9 which face is perpendicular to the one face; a first matching circuit 2 which matches the impedance of the first loop antenna 1 with the input impedance of a subsequent circuit; a second matching circuit 4 which matches the impedance of the second loop antenna 3 with the input impedance of a subsequent circuit; a high-frequency signal switching circuit 5 which selects the first loop antenna 1 or the second loop antenna 3; a receiving circuit 6 which demodulates a received signal from the first loop antenna 1 or the second loop antenna 3 to output a desired communication code, and which detects the received signal strength indication (RSSJ) of each of the antennas and controls the switching operation of the high-frequency signal switching circuit 5; and a circuit board 7 on which the first matching circuit 2, the second matching circuit 4, the high-frequency signal switching circuit 5, and the receiving circuit 6 are formed.

In the same manner as a usual loop antenna, each of the first and second loop antennas 1 and 3 of the device is configured by bending a rod-like metal (for example, copper) having a length which is about one fifth to one tenth of the wavelength. The loop antennas are mounted on the circuit board 7. In a pager receiver of the 280 MHz band, for example, the first and second loop antennas 1 and 3 are set to have a loop length of about 20 to 10 cm.

The first and second loop antennas 1 and 3 are disposed so as to respectively make contact with two faces of the six faces of the receiver case 9 and to be perpendicular to each other. The first loop antenna 1 is disposed as a rectangular loop which is parallel to the Y-Z plane in FIG. 1 and elongates in the Z-axis direction. Therefore, the principal polarization direction of the first loop antenna coincides with the Z-axis direction.

By contrast, the second loop antenna 3 is disposed as a rectangular loop which is parallel to the X-Y plane in FIG. 1 and elongates in the X-axis direction. Therefore, the principal polarization direction of the second loop antenna coincides with the X-axis direction. Consequently, the first and second loop antennas 1 and 3 are disposed so that their planes of polarization are perpendicular to each other.

The null point of the directivity of the first loop antenna 1 in the X-Z plane exists in the X-axis direction, and that of the directivity of the second loop antenna 3 in the X-Z plane exists in the Z-axis direction. Therefore, the directivities of the first and second loop antennas 1 and 3 with respect to incoming waves in the direction of the X-Z plane are complementary to each other.

In the same manner as usual matching circuits, the first and second matching circuits 2 and 4 consist of surface mount capacitor devices (combinations of fixed capacitance devices and variable capacitance devices). The high-frequency signal switching circuit 5 is configured as a high-frequency switching circuit formed by a PIN diode or a bands witching diode.

In a mobile communication system such as a pager system, usually, a time division multiplex system is employed. A receiver performs a reception operation during only a period of the reception time unit (own group) to which the receiver is allocated. By contrast, in the small portable receiver, in response to a switching control signal 8 from the receiving circuit 6, the high-frequency signal switching circuit 5 performs switching to the first loop antenna 1 and the second loop antenna 3 immediately before the allocated reception time unit (own group), and conducts sequentially the reception operation using the first loop antenna 1 and that using the second loop antenna 3. The receiving circuit 6 detects the received signal strength indication of each of the antennas, and supplies to the high-frequency signal switching circuit 5 the switching control signal 8 for selecting an antenna having a higher received signal strength indication, thereby designating the antenna which is to be used during the period of the reception time unit (own group) to which the receiver is allocated.

As a result, during the allocated reception time unit (own group), the reception is performed with using an antenna having a higher received signal strength indication.

In this way, in the antenna device of the first embodiment, reception is always performed while selecting an antenna of a higher antenna gain, irrespective of the plane of polarization and direction of an incoming wave. Therefore, stable reception performance can be ensured.

Second Embodiment

An antenna device of the second embodiment is configured so that high reception performance can be attained even when a radio receiver is not attached to a human body.

Figure 2:
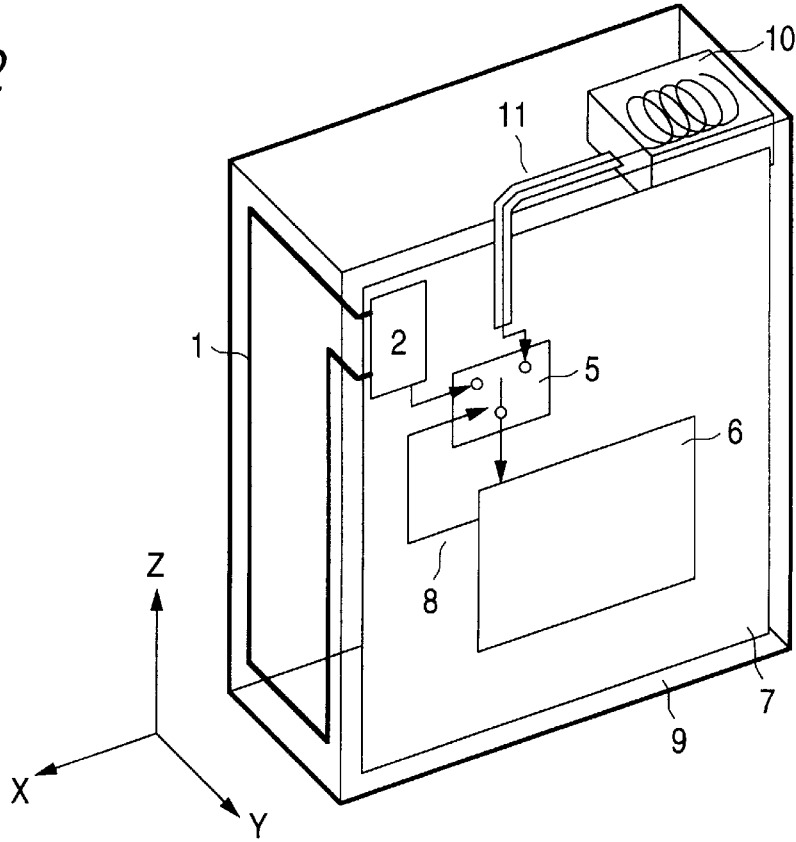
FIG. 2 is a diagram showing the configuration of a small portable receiver to which an antenna device of a second embodiment of the invention is attached.

As shown in FIG. 2, a small portable receiver on which the antenna device is mounted comprises: a loop antenna 1 which is formed on one face of a receiver case 9; a helical antenna unit 10 which is formed along another face of the receiver case 9 which face is perpendicular to the one face; a matching circuit 2 which matches the impedance of the loop antenna 1 with the input impedance of a subsequent circuit; a transmission line 11 which transmits a reception output of the helical antenna unit 10; a high-frequency signal switching circuit 5 which selects the loop antenna 1 or the helical antenna unit 10; a receiving circuit 6 which demodulates a received signal from the loop antenna 1 or the helical antenna unit 10, and which detects the received signal strength indication of each of the antennas and controls the switching operation of the high-frequency signal switching circuit 5; and a circuit board 7 on which these circuits are formed.

In the same manner as a conventional one, the helical antenna unit 10 has a small helical antenna which is formed in a dielectric. The helical antenna unit 10 is disposed inside the receiver case 9.

The helical antenna unit 10 operates as a normal mode helical antenna. The principal polarization direction coincides with the axial direction of the helix, i.e., the X-axis direction. The helical antenna unit 10 reacts to the electric field component of an electromagnetic wave. In the vicinity of a human body, therefore, the antenna gain of the helical antenna unit 10 is low. By contrast, in a place separated from a human body (free space), the antenna gain of the helical antenna unit 10 is higher than that of the loop antenna 1 which reacts to the magnetic field component.

In the small portable receiver, immediately before the allocated reception time unit (own group), the high-frequency signal switching circuit 5 performs switching to the loop antenna 1 and the helical antenna unit 10, and conducts sequentially the reception operation using the loop antenna 1 and that using the helical antenna unit 10. The receiving circuit 6 detects the received signal strength indication of each of the receptions using the respective antennas, and supplies to the high-frequency signal switching circuit 5 a switching control signal 8 for selecting an antenna having a higher received signal strength indication, thereby designating the antenna which is to be used during the period of the reception time unit (own group) to which the receiver is allocated.

Therefore, the loop antenna 1 is selected when the receiver is in the vicinity of a human body, and the helical antenna unit 10 is selected when the receiver is separated from a human body.

As described above, in the antenna device of the second embodiment, high reception performance can be ensured even when the receiver is not attached to a human body.

Third Embodiment

In a small portable receiver of a third embodiment, a reset switch for resetting ringback tone of the receiver is drawn out to the outside from the receiver body, and an external antenna is connected to the receiver body by using the reset switch.

Figure 3:
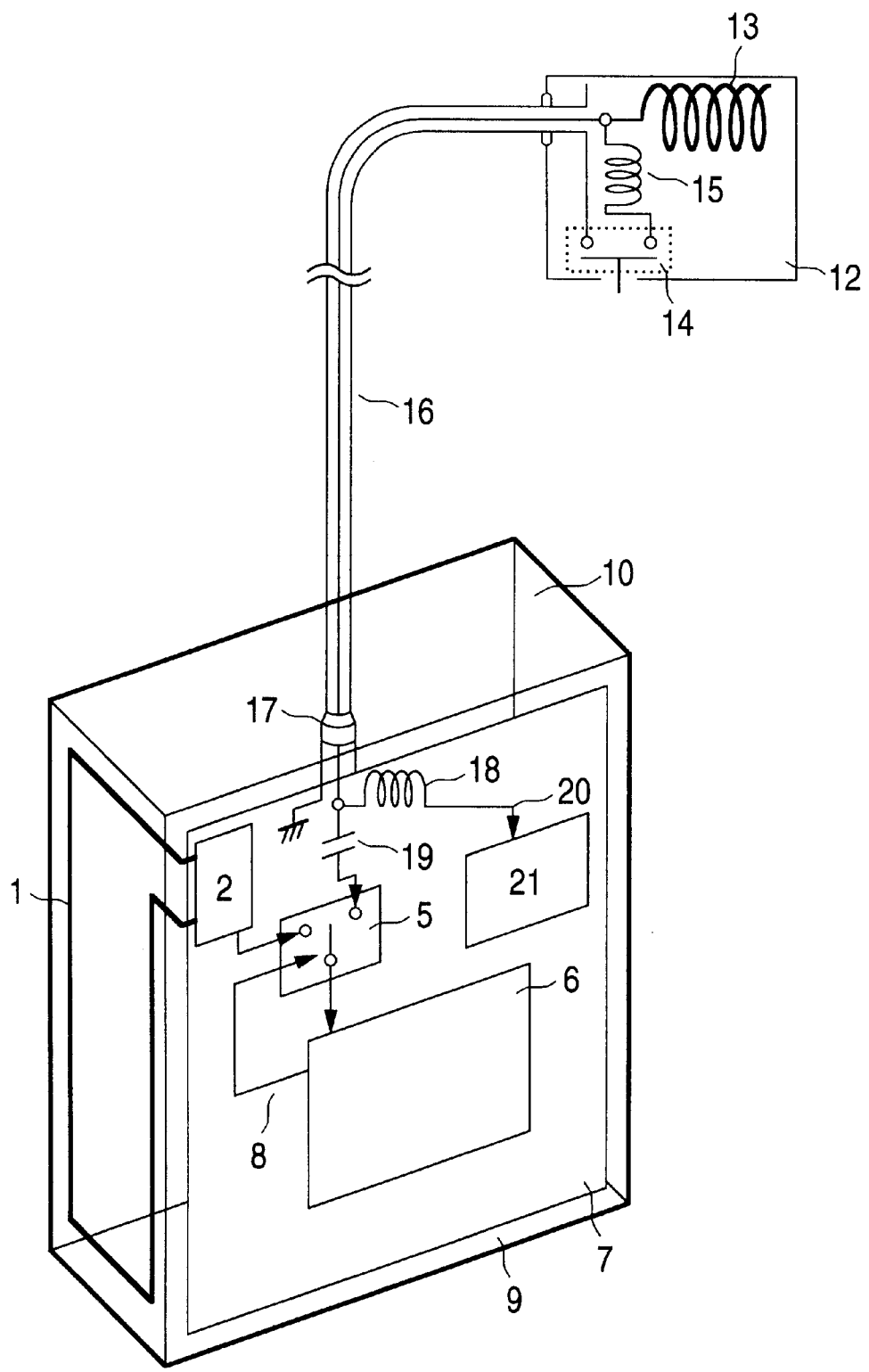
FIG. 3 is a diagram showing the configuration of a small portable receiver to which an antenna device of a third embodiment of the invention is attached.

As shown in FIG. 3, the small portable receiver on which the antenna device is mounted comprises: a loop antenna 1 which is formed on one face of a receiver case 9; a matching circuit 2 which matches the impedance of the loop antenna 1 with the input impedance of a subsequent circuit; an external reset switch 12 into which a reset switch 14 for ringback tone, an external helical antenna 13, and a first high-frequency choke coil 15 are incorporated; a high-frequency cable 16 through which the external reset switch 12 is connected to the receiver body via a connector portion 17; a DC blocking capacitor 19 which blocks a DC current flowing through the internal conductor of the high-frequency cable 16 and allows only a high-frequency signal to pass therethrough; a second high-frequency choke coil 18 which blocks the high-frequency signal flowing through the internal conductor of the high-frequency cable 16 and allows only the DC current to pass therethrough; a control circuit 21 which resets ringback tone in response to a reset switch signal 20 passing through the second high-frequency choke coil 18; a high-frequency signal switching circuit 5 which selects the loop antenna 1 or the external helical antenna 13; a receiving circuit 6 which demodulates a received signal from the loop antenna 1 or the external helical antenna 13, and which detects the received signal strength indication of each of the antennas and controls the switching operation of the high-frequency signal switching circuit 5; and a circuit board 7 on which these circuits are formed.

The external reset switch 12 into which the external helical antenna 13 and the reset switch 14 are incorporated has a function as a reset switch for ringback tone and the like, and also another function as an external antenna. The reset switch 14 is a DC switch and resets ringback tone and the like by means of ON/OFF operations. One terminal of the reset switch 14 is connected to the internal conductor of the high-frequency cable 16 via the first high-frequency choke coil 15, and the other terminal is connected to the external conductor (GND) of the high-frequency cable 16.

The first high-frequency choke coil 15 is set to have a sufficiently high impedance at the received frequency (for example, 280 MHZ) so that the ON/OFF state of the reset switch 14 does not affect the high-frequency characteristics of the external helical antenna 13.

The external reset switch 12 is coupled to the receiver body so that, when the small portable receiver such as a pager is in a pocket or attached to a waist belt, ringback tone can be reset from a position remote from the receiver. When the pager is in a handbag or a brief case, the external reset switch 12 is drawn out to a position close at hand so that ringing sound is quickly reset.

In this way, the external reset switch 12 is usually placed at a position which is separated from the receiver case 9 by several tens of centimeters. Consequently, the external helical antenna 13 is not affected by circuit components in the receiver case 9. In the antenna device, therefore, the antenna gain can be made higher than the case such as shown in FIG. 2 in which the helical antenna is disposed in the receiver case 9. The received signal from the external helical antenna 13 is transmitted to the receiver through the high-frequency cable 16.

The high-frequency cable 16 is connected to the receiver via the connector portion 17. The internal conductor of the high-frequency cable 16 is connected to the high-frequency signal switching circuit 5 via the first DC blocking capacitor 19 in a high-frequency manner, and also to the control circuit 21 via the second high-frequency choke coil 18 in a DC-like manner. The external conductor (GND) of the high-frequency cable 16 is connected to the GND of the circuit board 7 (the GND of the receiver).

Therefore, the received signal from the external helical antenna 13 passes through the DC blocking capacitor 19 and is then supplied to the receiving circuit 6 via the highfrequency signal switching circuit 5. By contrast, the reset switch signal 20 from the reset switch 14 is supplied to the control circuit 21 via the second high-frequency choke coil 18. The control circuit 21 controls the operation of resetting ringing sound.

In the same manner as the first high-frequency choke coil 15, the second high-frequency choke coil 18 is set to have a sufficiently high impedance at the received frequency (for example, 280 MHz) so that the state of the reset switch signal 20 does not affect the antenna characteristics.

In the small portable receiver, immediately before the allocated reception time unit (own group), the high-frequency signal switching circuit 5 performs switching to the loop antenna 1 and the external helical antenna 13, and conducts sequentially the reception operation using the loop antenna 1 and that using the external helical antenna 13. The receiving circuit 6 detects the received signal strength indication of each of the receptions using the respective antennas, and supplies to the high-frequency signal switching circuit 5 a switching control signal 8 for selecting an antenna having a higher received signal strength indication, thereby designating the antenna which is to be used during the period of the reception time unit (own group) to which the receiver is allocated.

In the case where the external reset switch 12 is separated from a human body and the antenna characteristics of the external helical antenna 13 are superior to those of the loop antenna 1, therefore, the external helical antenna 13 is selected.

As described above, in the antenna device of the third embodiment, the external antenna is disposed by using the configuration of the external reset switch, and the transmission line of the external reset switch is used also as that of the external antenna. As a result, connection of an external antenna can be realized by a simple configuration without increasing the number of terminals for connection, and high reception performance can be obtained through the external antenna.

Fourth Embodiment

In a small portable receiver of a fourth embodiment, reception outputs of plural antennas are amplified and one of the amplified reception outputs is then selected.

Figure 4:
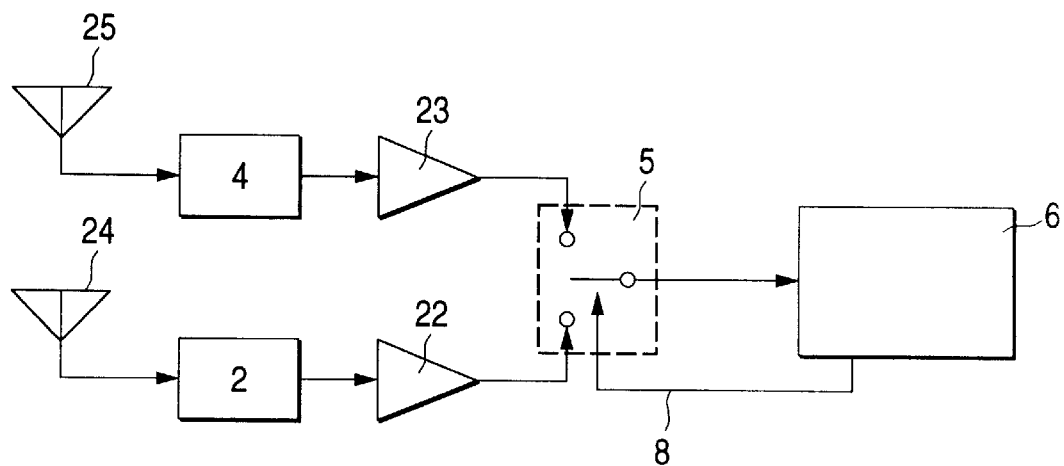
FIG. 4 is a block diagram showing the configuration of an antenna device of a fourth embodiment of the invention.

As shown in FIG. 4, the small portable receiver comprises: first and second antennas 24 and 25; a first matching circuit 2 which matches the impedance of the first antenna 24 with the input impedance of a subsequent circuit; a second matching circuit 4 which matches the impedance of the second antenna 25 with the input impedance of a subsequent circuit; a first low-noise amplifier 22 which amplifies an output of the first matching circuit 2; a second low-noise amplifier 23 which amplifies an output of the second matching circuit 4; a high-frequency signal switching circuit 5 which selects one of received signals of the first antenna 24 and the second antenna 25; and a receiving circuit 6 which demodulates a received signal of the first antenna 24 or that of the second antenna 25, and which detects the received signal strength indication of each of the antennas and controls the switching operation of the high-frequency signal switching circuit 5.

The first and second antennas 24 and 25 constitute a diversity antenna, and correspond to the loop antenna or the helical antenna in the first embodiment (FIG. 1), the second embodiment (FIG. 2), and the third embodiment (FIG. 3).

The reception output of the first antenna 24 is supplied to the first low-noise amplifier 22 via the first matching circuit 2, and that of the second antenna 25 is supplied to the second low-noise amplifier 23 via the second matching circuit 4. The reception outputs are then amplified. Each of the first and low-noise amplifiers 22 and 23 is composed of a high-frequency transistor and has a power gain of about 15 to 20 dB.

Either of the outputs which have been respectively amplified by the first and low-noise amplifiers 22 and 23 is selected by the high-frequency signal switching circuit 5, and then supplied to the receiving circuit 6.

Usually, the high-frequency signal switching circuit 5 has a high-frequency transmission loss of about 0.5 to 1 dB. When the high-frequency signal switching circuit 5 is connected immediately behind an antenna matching circuit as in the case of the first to third embodiments, the loss (about 0.5 to 1 dB) directly impairs the total reception sensitivity.

By contrast, in the embodiment, the received signals from the first and second antennas 24 and 25 are first low-noise amplified and then selected by the high-frequency signal switching circuit 5. Therefore, the high-frequency transmission loss (about 0.5 to 1 dB) of the high-frequency signal switching circuit 5 does not affect the reception sensitivity.

When the received signal strength indications of antennas are to be detected and an antenna having a higher received signal strength indication is to be selected, therefore, the selection operation can be exactly performed. The use of the selected antenna enables the reception operation during the period of the reception time unit (own group) to which the receiver is allocated, to be performed at a high reception sensitivity.

As described above, in the antenna device of the fourth embodiment, an effect due to the transmission loss of the high-frequency signal switching means for switching over the antennas can be eliminated and high reception performance can be ensured.

Fifth Embodiment

In a fifth embodiment, a specific example of a circuit constituting the low-noise amplifying means and the high-frequency signal switching means of the device of the fourth embodiment will be described.

Figure 5:
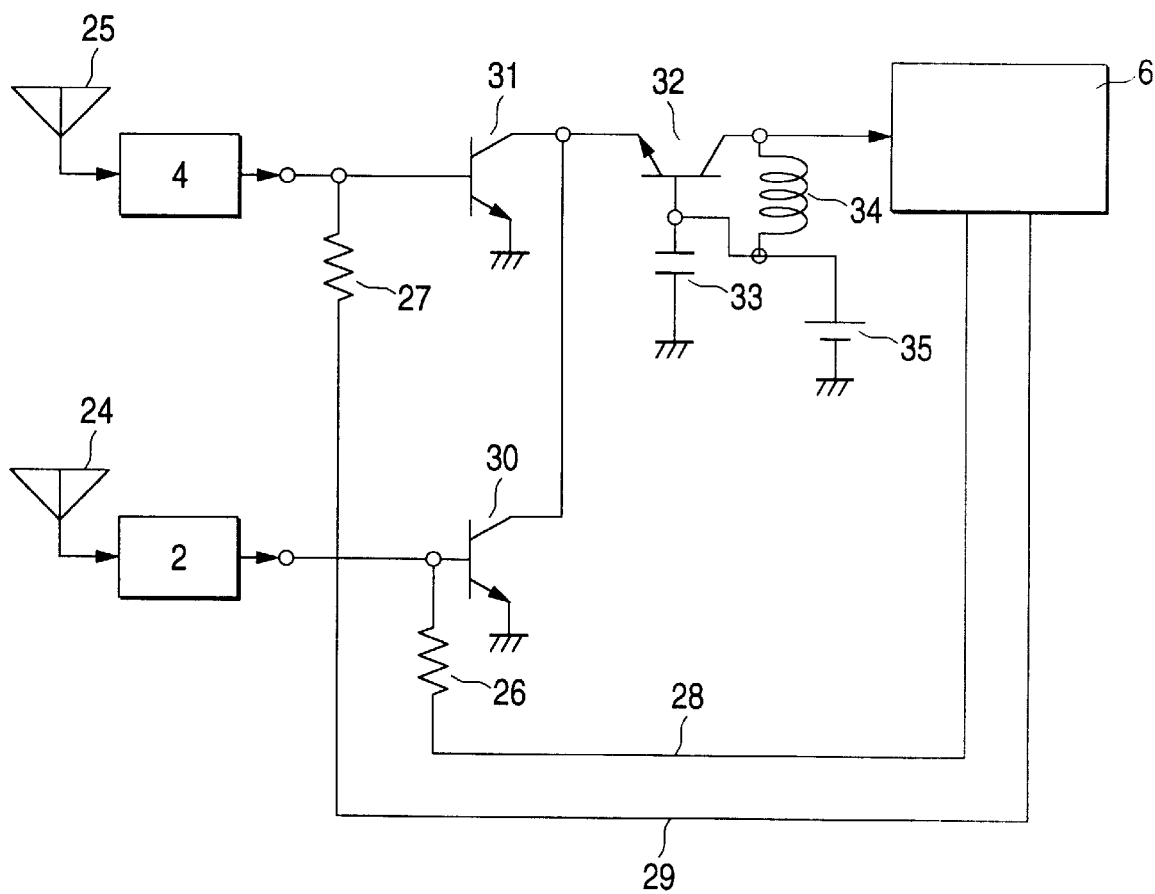
FIG. 5 is a circuit diagram showing an antenna device of a fifth embodiment of the invention.

As shown in FIG. 5, the small portable receiver comprises: first and second antennas 24 and 25; first and second matching circuits 2 and 4; a receiving circuit 6 which demodulates a received signal of the first antenna 24 or that of the second antenna 25, and which detects the received signal strength indication of each of the antennas and outputs first and second bias voltages 28 and 29 for controlling the switching of the antennas; a first high-frequency transistor 30 in which the first bias voltage 28 output via a first bias resistor 26 from the receiving circuit 6, and a reception output from the first antenna 24 are supplied to the base; a second high-frequency transistor 31 in which the second bias voltage 29 output via a second bias resistor 27 from the receiving circuit 6, and a reception output from the second antenna 25 are supplied to the base; a third high-frequency transistor 32 which is connected to the collectors of the first and second high-frequency transistors 30 and 31 and cooperates with the first high-frequency transistor 30 and the second high-frequency transistor 31 to constitute a low-noise amplifying circuit of a cascade configuration; a grounding capacitor 33 which operates as a base-grounding capacitor for the third high-frequency transistor 32; a power source 35 which is connected to the base of the third high-frequency transistor 32; and a load coil 34 which supplies a power source voltage to the collector of the third high-frequency transistor 32.

In the device, the first high-frequency transistor 30 and the third high-frequency transistor 32, or the second high-frequency transistor 31 and the third high-frequency transistor 32 constitute a low-noise amplifying circuit of a cascade configuration. The voltage of the power source 35 is supplied to the collector of the third high-frequency transistor 32 via the load coil 34. The voltage is varied in accordance with the high-frequency signal which is amplified by the low-noise amplifying circuit. The high-frequency output from the collector is supplied to the receiving circuit 6.

When the receiving circuit 6 is to select the side of the first antenna 24, the receiving circuit 6 sets the first bias voltage 28 to the power source voltage (High) and the second bias voltage 29 to the GND (Low) level.

As a result, the bias voltage is supplied to the base of the first high-frequency transistor 30, and the first high-frequency transistor 30 enters the operation state to cooperate with the third high-frequency transistor 32 to function as a low-noise amplifying circuit of a cascade configuration. At this time, the second high-frequency transistor 31 is in the cut-off state and does not operate. When the receiving circuit 6 is to select the side of the second antenna 25, the circuit operates in the manner opposite to that of the above.

As described above, in the device of the fifth embodiment, the low-noise amplifier and the high-frequency signal switching means can be configured by a required minimum circuit configuration, and high reception performance can be ensured.

In the embodiments described above, an antenna of a higher received signal level is selected by using a high-frequency signal switching circuit. By contrast, in the case where, in an area of a strong electric field in which a jamming wave is generated, reception of the jamming wave is to be suppressed, it is required to select an antenna of a lower received signal level. In such a case, received signal levels of received signals from the antennas are compared with a threshold, and, when all the received signal levels exceed the threshold, a high-frequency signal switching circuit selects an antenna of a lower received signal level. According to this configuration, the antijam properties of a portable radio receiver in an area of a strong electric field can be improved.

As apparent from the above description, in the antenna device of the invention, reception is always performed while selecting an antenna of a higher antenna gain irrespective of the plane of polarization and direction of an incoming wave. Therefore, stable reception performance can be ensured.

In a device in which a helical antenna is used as one of plural antennas, even when the receiver is not attached to a human body, it is possible to ensure high reception performance.

In a device in which a transmission line for a reset switch signal is used also as that for a received signal of an external antenna, connection of the external antenna can be realized by a simple configuration without increasing the number of terminals for connection.

In a device in which reception outputs of plural antennas are amplified and one of the amplified reception outputs is then selected, an effect due to a transmission loss of high-frequency signal switching means for switching over the antennas can be eliminated and high reception performance can be ensured.

In a device in which high-frequency transistors in a cascade configuration constitute a low-noise amplifying circuit, low-noise amplifying means and high-frequency signal switching means can be configured by a required minimum circuit configuration, and high reception performance can be ensured.

A radio receiver to which such an antenna device is attached can stably receive a radio wave irrespective of the orientation of the radio receiver.

What is claimed is:

1. An antenna device for use in a portable radio receiver, comprising:

plural, separate loop antennas which are disposed along different faces of a case of the radio receiver, respectively;

low-noise amplifiers which amplify received signals from said antennas, respectively;

a receiving circuit which selects one of the antennas and low-noise amplifiers by switching a bias of the amplifier to detect the strengths of received signals from the loop antennas, said receiving circuit generating a switching signal for selecting the received signal having the highest receiving signal level; and switching means for receiving the switching signal and in response thereto, selecting the received signal having the highest receiving signal level.

2. An antenna device according to claim 1, wherein said plural loop antennas are two loop antennas which are disposed along two faces of said case, said faces perpendicularly intersecting with each other.

3. An antenna device according to claim 1, wherein said antenna device further comprises plural high-frequency transistors to which said received signals from said antennas are supplied, respectively, collector outputs of said high-frequency transistors are connected together, and selection of said received signals is performed by controlling base biases of said high-frequency transistors.

4. A portable radio receiver comprising an antenna device according to claim 1.

5. An antenna device for use in a portable radio receiver, comprising:

a loop antenna which is disposed along at least one face of a case of the radio receiver and having a Principal polarization direction;

a helical antenna which is disposed along another face of said case and having a principal polarization direction different from the principal polarization of the loop antenna;

a receiving circuit operable to detect the strengths of received signals from the loop antenna and the helical antenna, said receiving circuit generating a switching signal for selecting the received signal having the highest receiving signal level; and switching means for receiving the switching signal and in response thereto, selecting the received signal having the highest receiving signal level.

6. An antenna device according to claim 5, further comprising:

low-noise amplifiers which amplify received signals from said antennas, respectively, and wherein said switching means selects one of received signals which are amplified by said low-noise amplifiers.

7. An antenna device according to claim 6, wherein said antenna device further comprises plural high-frequency transistors to which said received signals from said antennas are supplied, respectively, collector outputs of said high-frequency transistors are connected together, and selection of said received signals is performed by controlling base biases of said high-frequency transistors.

8. A portable radio receiver comprising an antenna device according to claim 5.

9. An antenna device for use in a portable radio receiver, comprising:

a loop antenna which is disposed along at least one face of a case of the radio receiver;

a switch unit which is drawn out to an outside from said case; a helical antenna which is incorporated into said switch unit;

a transmission line which transmits a switch signal of said switch unit and a received signal from said helical antenna, in a superimposed manner; and switching means for selecting one of received signals from said loop antenna and said helical antenna, and said antenna device performs reception with selecting one of said antennas, said selected one antenna having a higher receiving signal level.

10. An antenna device according to claim 9, further comprises:

low-noise amplifiers which amplify received signals from said antennas, respectively, and wherein said switching means selects one of received signals which are amplified by said low-noise amplifiers.

11. An antenna device according to claim 10, wherein said antenna device further comprises plural high-frequency transistors to which said received signals from said antennas are supplied, respectively, collector outputs of said high-frequency transistors are connected together, and selection of said received signals is performed by controlling base biases of said high-frequency transistors.

12. A portable radio receiver comprising an antenna device according to claim 9.

13. A method of determining a working antenna in which one working antenna to be used in reception is selected from plural antennas disposed in a portable radio receiver, the method comprising the steps of:

amplifying received signals from said antennas by low noise amplifiers, respectively;

sequentially selecting the amplified received signals;

detecting received signal levels of said sequentially selected received signals; and selecting the antenna having the highest received signal level as the working antenna.

14. A method of determining a working antenna according to claim 13, wherein collector outputs of plural high-frequency transistors to which said received signals from said antennas are supplied, respectively are connected together, and selection on said received signals is performed by turning ON or OFF application of a base bias to said high-frequency transistors.

15. A portable radio receiver in which a method of determining a working antenna according to claim 13 is executed.

16. A method of determining a working antenna in which one working antenna to be used in reception is selected from plural antennas disposed in a portable radio receiver, the method comprising the steps of:

comparing received signal levels of received signals from said antennas with a threshold; and selecting an antenna of a lowest received signal level as the working antenna when all of said received signal levels exceed said threshold.

17. A portable radio receiver in which a method of determining a working antenna according to claim 16 is executed.

* * * * *